W. M. BROWNELL.
METHOD OF DRYING CASEIN.
APPLICATION FILED MAY 5, 1916. RENEWED FEB. 20, 1917.
1,240,816.
Patented Sept. 25, 1917.
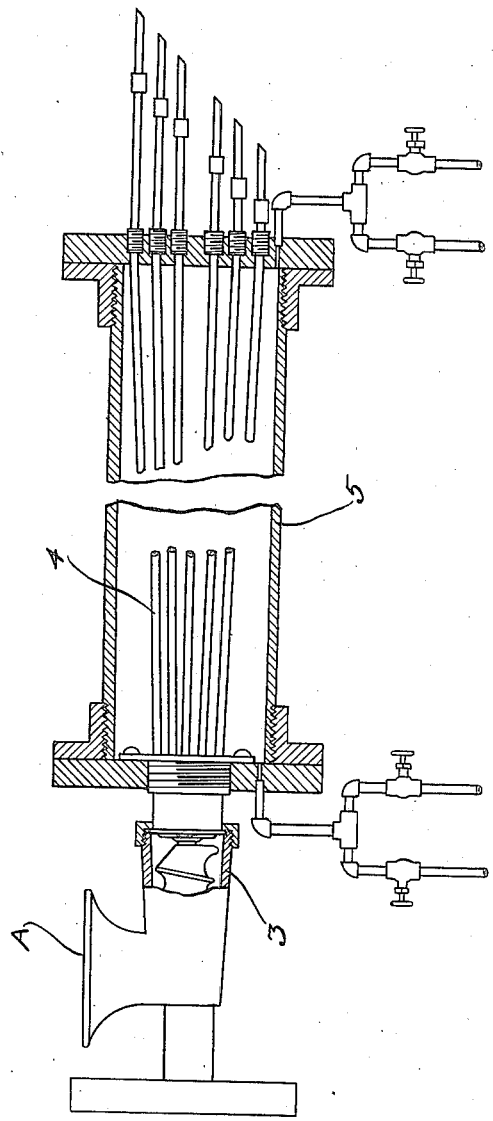
INVENTOR:
William M. Brownell
by Macleod, Calver, Copeland & Dike
Attys

UNITED STATES PATENT OFFICE.

WILLIAM M. BROWNELL, OF BROOKLYN, NEW YORK, ASSIGNOR OF THREE-FOURTHS TO ARTHUR N. HOOD AND JOHN T. NIGHTINGALE, OF BOSTON, MASSACHUSETTS.

METHOD OF DRYING CASEIN.

1,240,816.   Specification of Letters Patent.   Patented Sept. 25, 1917.

Application filed May 5, 1916, Serial No. 95,682. Renewed February 20, 1917. Serial No. 149,937.

*To all whom it may concern:*

Be it known that I, WILLIAM M. BROWNELL, a citizen of the United States, residing at the borough of Brooklyn, county of Kings, State of New York, have invented a certain new and useful Improvement in Methods of Drying Casein, of which the following is a specification, reference being had therein to the accompanying drawings.

My invention has for its object a new and improved method of drying green curds during the manufacture of casein, after they have been precipitated from the skim milk or buttermilk by the use of a suitable precipitant. Heretofore great difficulty has been experienced in the manufacture of casein because the process of drying the curds has been very slow and therefore has resulted in fermentation in the curds which produces various acids, chiefly such as lactic and butyric and also discolors the curds. Especial difficulty is experienced in drying rennet casein because the curds precipitated by the use of rennet are of a sticky adhesive nature.

My novel process affords a method of drying casein which is so rapid in its action that the drying may be completed before bacterial action or fermentation can take place to any appreciable extent. It therefore produces a casein which is low in acid content and which may be employed with a minimum of alkali. It is also light in color and therefore capable of use in the manufacture of fine coated papers and for other purposes where a light colored casein is required.

My invention will be fully understood by reference to the following description, taken in connection with the accompanying drawing, and the novel features thereof are pointed out and fully defined in the claim at the close hereof.

In the drawing I have shown a diagrammatic view indicating a machine by means of which my process may be practised.

The process consists essentially in heating the green curds after the whey has been drawn off until the green curds have softened and partly melted, and are therefore in a condition to be rendered homogeneous by mechanical action. Then I force the material through heated tubes in which they are subjected to a sufficient degree of heat to convert the moisture contained therein into steam and finally permit the material to emerge suddenly into the open air so that the moisture will pass off in the form of steam. In practising my invention I take the green curds after the whey has been drawn off and place them in a vat, heating the curds to a temperature of from 135 to 180° Fahrenheit. The curds are thus softened and are converted into a plastic doughy sticky mass. The mass is then placed in the hopper A of the machine shown in the drawings, by which it is fed by suitable mixing and impelling mechanism, shown in the drawings as a screw revolving in the casing 3. This screw serves to render the mass homogeneous and also to force it through the tubes 4 which are subjected to heat by means of the steam jacket 5. This steam jacket contains a suitable heating medium, as for instance steam at about 100 lbs. pressure. The heat converts the moisture in the casein into steam as it is forced through the tubes, and as the material emerges from the ends of the tubes the steam escapes into the atmosphere. It will be understood that if desired my process may be used as an adjunct of the ordinary process of drying and for the purpose of preparing the material for final drying. When this is done the green curds are treated as described and the product from the drying machine is then put in pans or trays in a suitable drier. The result of this procedure is that the drying takes so short a time that the fermentation and bacterial growth is practically eliminated.

What I claim is—

The method of drying casein which consists in heating it until it becomes a plastic adhesive mass, then passing it under pressure through a heated passage, and then allowing it to emerge into the open air.

In testimony whereof I affix my signature, in presence of two witnesses.

WILLIAM M. BROWNELL.

Witnesses:
H. ALBERTUS WEST,
W. L. COVERT.